Sept. 20, 1971 R. ISAACS ET AL 3,605,877

RECEIVER CIRCUIT ASSEMBLY

Filed June 26, 1969 4 Sheets-Sheet 1

INVENTORS
ROGER ISAACS
ALBERT STERN
BY Lilling and Siegel
ATTORNEYS

RECEIVER CIRCUIT ASSEMBLY

Filed June 26, 1969 4 Sheets-Sheet 2

INVENTORS
ROGER ISAACS
ALBERT STERN
BY Lilling and Siegel
ATTORNEYS

INVENTORS
ROGER ISAACS
ALBERT STERN
BY Lilling and Siegel
ATTORNEYS

RECEIVER CIRCUIT ASSEMBLY

Filed June 26, 1969 4 Sheets-Sheet 4

INVENTORS
ROGER ISAACS
ALBERT STERN
BY Lilling and Siegel
ATTORNEYS

United States Patent Office 3,605,877
Patented Sept. 20, 1971

3,605,877

RECEIVER CIRCUIT ASSEMBLY

Roger Isaacs, 953 E. 9th St., and Albert Stern, 929 E. 18th St., both of Brooklyn, N.Y. 11230

Filed June 26, 1969, Ser. No. 836,860
Int. Cl. F25b *29/00*
U.S. Cl. 165—26 82 Claims

ABSTRACT OF THE DISCLOSURE

The present invention pertains to an RF receiver circuit assembly and more particularly to a receiver operatively associated with remote controlled heating and cooling systems having fans and adapted to demodulate a complex RF signal having an RF component, a mid-range audio frequency component and a low frequency component and including associated output circuits operatively connected to the receiver which are responsive to the low frequency component to selectively activate said heating and cooling systems and the fans in a predetermined manner.

The present invention is directed to a receiver and associated output circuits for activating heating and cooling systems and fans connected therewith in response to the reception of a selected transmission to said receiver.

BACKGROUND OF THE INVENTION

The present invention is for use in conjunction with remotely disposed transmitters such as the type used in conjunction with remote control systems for sensing conditions at a position to be controlled and wherein a signal is transmitted to the receiver to affect the operation of control means connected to the receiver output at a position which is remote from that which is to be controlled and whereat the conditions are sensed.

In particular, the receiver circuit assembly of the present invention is for use in conjunction with remote controlled heating systems of the type described in our earlier filed patent applications entitled Wireless Remote Control System, Ser. No. 704,877, filed Feb. 12, 1968; and Portable and Wireless Remote Control Apparatus for Sensing, Signalling, Indicating and Controlling Temperature, Ser. No. 784,454 and filed Dec. 17, 1969.

The receiver circuit assembly of the present invention is adapted to receive and demodulate a complex signal having an RF component, mid-range audio frequency component and a low frequency component and to supply said demodulated low frequency component to output circuits associated with said receiver to control heating and cooling systems and fans connected to the output of said associated circuits as load devices.

SUMMARY OF THE INVENTION

It is, therefore, the primary object of the present invention to provide a new and novel receiver circuit assembly especially adapted for use in conjunction with remote controlled heating and cooling systems.

It is another object of the present invention to provide receiver circuitry operable to demodulate a complex signal having three separable frequency components and for feeding the lowest frequency component thereof to associated output circuits to control the operation of a remotely disposed heating and cooling system.

It is a more particular object of the present invention to provide a new and novel receiver circuit assembly of the aforementioned type to control a remotely disposed heating and cooling system causing the same to selectively supply heat upon reception of the lowest frequency signal component to the output circuit thereof and to selectively supply cooling upon reception of the lowest frequency signal component to the output circuit thereof.

It is yet another object of the present invention as described hereinbefore to provide an output circuit connected to the receiver which is operable upon reception of a low frequency signal from the receiver to selectively and independently activate a fan circuit forming part of the remotely disposed heating and cooling system.

It is still a further object of the present invention to provide a new and novel electro-mechanical flip-flop circuit which comprises the fan activating circuit and which is successively operable to commence and cease operation of the fan upon the reception of successive pulses to the fan activating circuit.

BRIEF DESCRIPTION OF THE DRAWINGS

These and other objects, features and advantages of the present invention will become more apparent from the following detailed description hereinafter considered in conjunction with the accompanying drawings wherein.

DESCRIPTION OF THE PREFERRED EMBODIMENT

Figure 1:
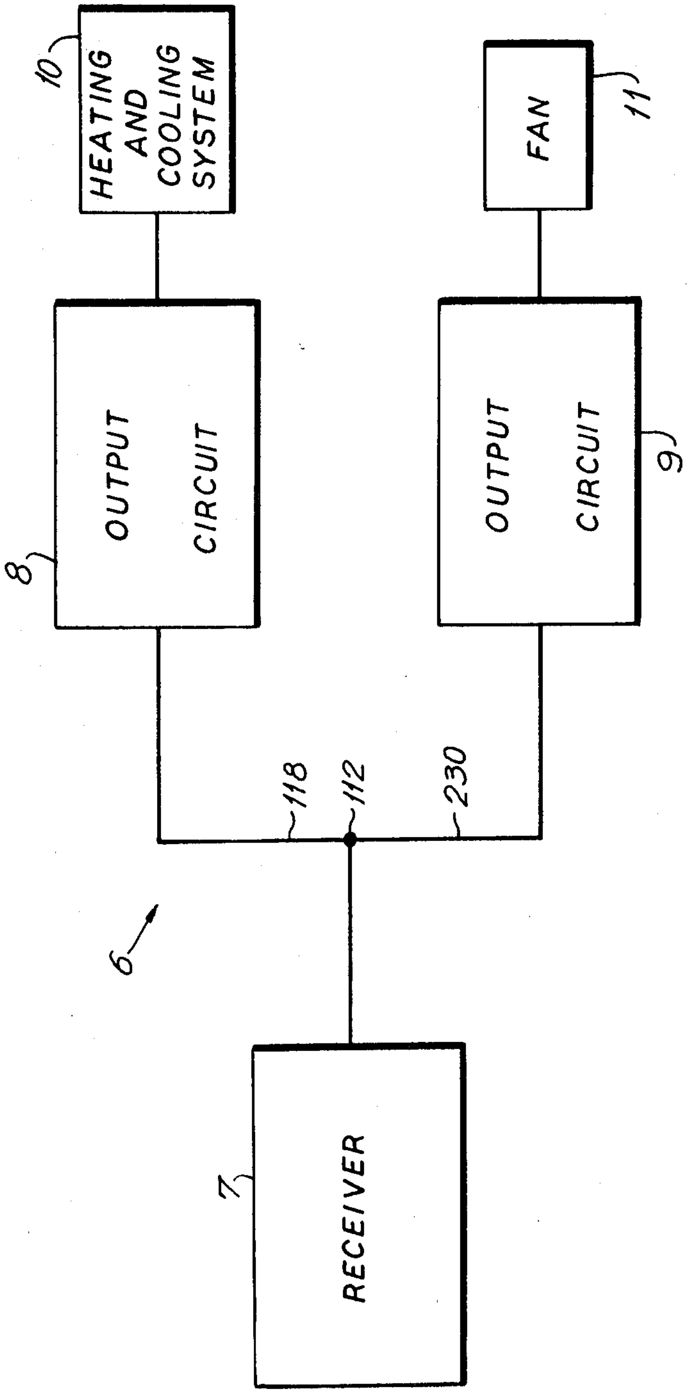
FIG. 1 is a block diagram depicting the various portions comprising the receiver circuit assembly of the present invention.

Referring now to the drawings, and more particularly to FIG. 1 thereof, there is shown a receiver circuit assembly generally denoted by the reference numeral 6 and constructed in accordance with the principles of the present invention.

The circuit assembly 6 includes a receiver portion 7 having first and second output circuits 8 and 9, respectively, connected thereto. The output circuit 8 has a heating and cooling system 10 connected as the output load thereof, while output circuit 9 has a fan connected as the output load thereof.

Figure 2:
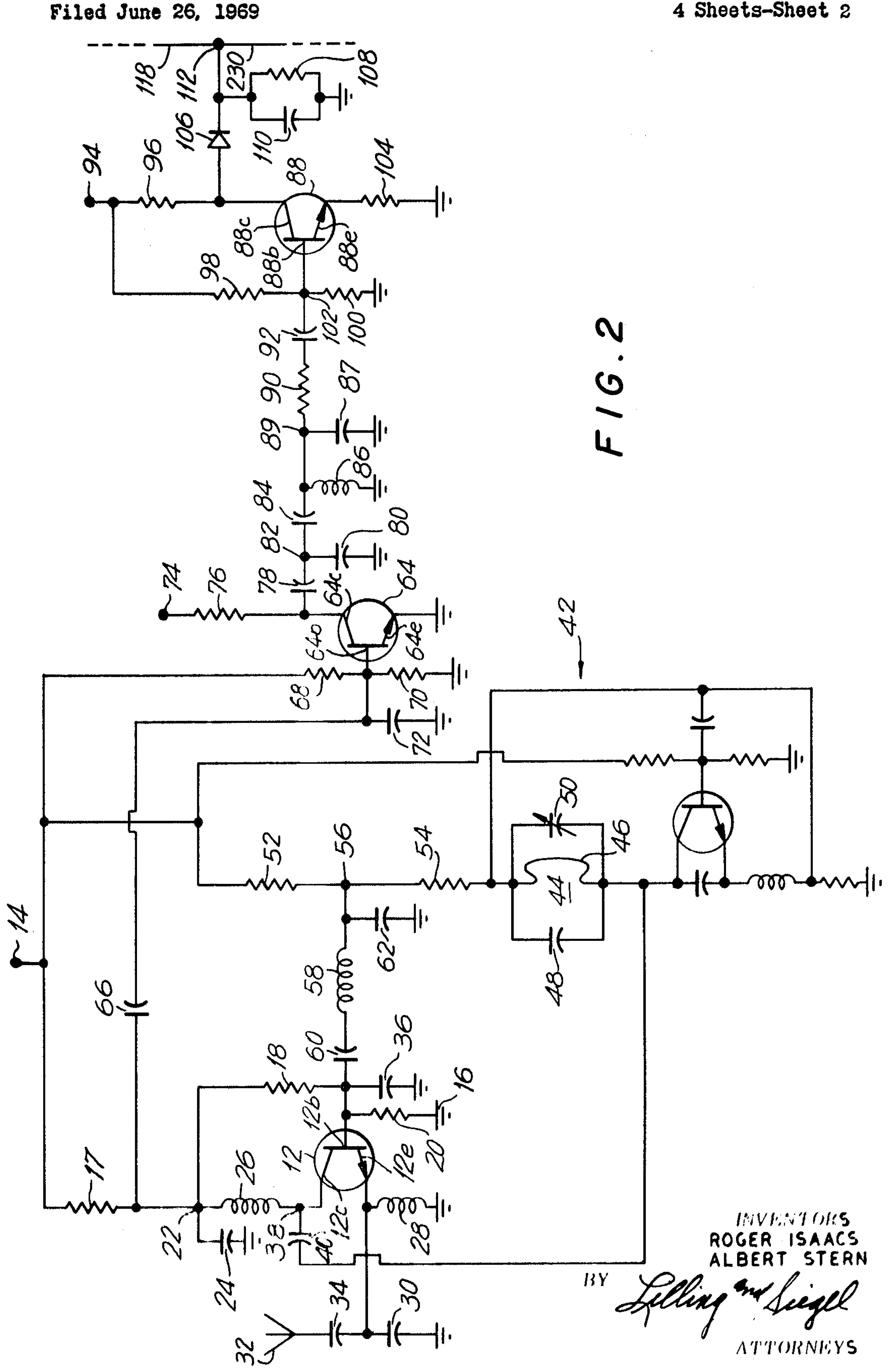
FIG. 2 is a schematic representation of the receiver portion of the assembly shown in FIG. 1.

With reference now to FIG. 2, the receiver 7 includes an RF input transistor amplifier 12 of the n-p-n type having a base **12*b*, a collector 12*c* and an emitter 12*e*. A source of B+ potential 14 provides the proper bias upon the base 12*b* by means of a voltage divider network connected between the source 14 and a ground terminal 16 and comprising the resistors 17, 18 and 20. The resistor 17 is connected between the source 14 and a junction point 22, the resistor 18 is connected between the junction 22 and the base 12*b* and the resistor 20 is connected between the base 12*b* and the ground terminal 16. The junction 22 is connected through a capacitor 24 to ground and through an RF choke 26 to collector 12*c***.

The emitter **12*e* is connected to ground by the parallel combination of an RF choke 28 and a capacitor 30. The emitter is also connected to a receiving antenna 32 by means of a capacitor 34. The capacitor 34 serves to isolate the emitter 12*e* from the antenna 32 and in conjunction with capacitor 30** forms a voltage divider network for feeding an input signal from the antenna to the emitter, in a manner to be described in more detail hereinafter.

A capacitor 36 is connected in parallel with the voltage dividing resistor 20 between the base **12*b* and ground, and the function of capacitor 36** will be described in detail in conjunction with the operation of the receiver, hereinafter.

The collector 12$c$ is connected from a junction 38 through a coupling capacitor 40 to the output of a transistor oscillator circuit generally designated by the reference numeral 42. The oscillator includes an output tank circuit 44 comprising the parallel combination of an inductor 46 and capacitor 48 and including a variable capacitor 50 in parallel therewith, which capacitor is adapted to vary the frequency of oscillation to which the tank 44 is tuned and thus the frequency of oscillation of oscillator 42.

The output of the tank circuit is produced across the pair of resistors 52 and 54 whose junction 56 is connected to base 12$b$ of transistor 12 through an RF choke 58 and a coupling capacitor 60. The junction 56 is also connected through a capacitor 62 to ground.

The collector 12$c$ of transistor 12 is connected to the input of an n-p-n transistor amplifier designated generally by the reference numeral 64, by connecting the junction 22 through a coupling capacitor 66. A bias voltage is supplied to the base 64$b$ of the transistor 64 by the B+ source 14 via the biasing resistors 68 and 70. The base is also connected to ground via a capacitor 72.

The collector 64$c$ is forward biased by means of a B+ source 74 and biasing resistor 76 while the emitter 64$e$ is connected directly to ground, whereby the amplifier 64 is connected in a common emitter configuration.

The output from transistor amplifier 64 is taken from collector 64$c$ and the collector is connected to a pair of parallel connected capacitors 78 and 80. The junction 82 between capacitors 78 and 80 is connected to a series tuned circuit comprising a capacitor 84 and an inductor 86 and therefrom to the base 88$b$ of an n-p-n transistor amplifier 88 through the series connection of a resistor 90 and a coupling capacitor 92.

The collector 88$c$ is forward biased by connecting the same to a source of B+ potential 94 via a biasing resistor 96. The base 88$b$ has a bias potential supplied thereto by means of biasing resistors 98 and 100 connected between source 94 and ground with the junction 102 between the resistors being connected to the base.

The emitter 88$e$ is connected to ground through a resistor 104.

The output of transistor amplifier 88 is taken from collector 88$c$ and is connected to the input of a demodulating diode 106 whose output is connected to the combination of a resistor 108 and capacitor 110 in parallel and to the junction 112.

It is herein to be noted that the receiver circuit assembly 6 herein is for use with remotely disposed heating and cooling systems, as will become more apparent hereinafter, wherein a signal is transmitted thereto via a wireless transmitter of the type described in our presently pending patent application entitled "Transmitter for Producing Complex Modulated Carrier Signals", Ser. No. 836,700, filed on even date herewith. Since there are presently in existence various types of wireless transmission apparatus wherein a carrier wave is modulated by an information signal, it is extremely important that the signal transmitted to and adapted to be accepted by the present receiver circuit assembly be significantly dissimilar from that transmitted by any other type of wireless transmission apparatus; one example of which is automatic garage door openers. Thus, the type of signal employed in the present invention is complex and comprises, in effect, a double modulated carrier wave. More particularly, an RF carrier is modulated by a mid-range audio frequency signal which in turn has been modulated by a low frequency signal component. Therefore, the receiver is operable to demodulate the complex signal and produce the resultant low frequency signal component as the output of the demodulator stage thereof and if a signal is received having only two of the three components thereof, the ultimate output of the receiver circuit assembly, i.e., the heating and cooling system, will not be erroneously activated.

By way of illustration, the RF carrier wave may have a frequency in the 300 mHz. range, while the mid-range audio frequency may lie from between 10–20 kHz. and the low frequency component may be 200 or 100 hertz, as will appear more fully hereinafter.

In the operation of the receiver 7, the composite signal is received by the antenna 32 and applied as an input signal to the emitter 12$e$. More particularly, and as discussed previously, the signal is an RF signal whose carrier frequency is in the 300 mHz. range and at this frequency the capacitor 36 has a very small reactance and effectively connects the base 12$b$ to ground, whereby the amplifier 12 appears to have a grounded base configuration and the input signal is actually applied to the emitter-base circuit of the amplifier.

The input signal to amplifier 12 causes conduction therethrough and an output signal appears at the collector 12$c$. It is herein to be noted, however, that no output signal is produced across the resistor 17, at this time, so that the resistor 17 is not acting as an output resistor of the amplifier 12. This is due to the fact that at the frequency specified, the RF choke 26 prevents any signal conduction therethrough and further due to the fact that the junction 22 is effectively connected to ground by means of the capacitor 24, since at this frequency the reactance of capacitor 24 is negligible. It will also be appreciated that the grounded base configuration of the amplifier 12 presented to the input signal results in very little amplification of the input signal. Thus, the input signal, substantially as received, is presented at the collector 12$c$ and is coupled via the coupling capacitor 40 to the output circuit of the oscillator 42 which is maintained in an oscillatory state by the components thereof and the B+ source 14. The application of the input signal from collector 12$c$ to the output tank 44 of the oscillator 42 causes the amplitude of the oscillations across the tank to be greatly increased. It will, of course, be appreciated that during oscillation there is a high gain amplification produced across the output tank 44 and across the oscillator output which comprises the resistors 52 and 54. In practice, it has been found advisable to make resistors 52 and 54 equal so that one half of the oscillator output voltage appears at junction 56.

The signal appearing at junction 56 is the amplified composite input signal whose RF carrier frequency has been verified as the correct frequency by virtue of the fact that it has produced a significant or appreciable signal amplitude at junction 56 by driving oscillator 42 into significant oscillation at the RF frequency to which it was tuned by means of its tank circuit 44. Stated alternatively, the oscillator circuit 42 is a synchronous oscillator which will pass an input signal applied to the output tank thereof across the oscillator load, comprising resistors 52 and 54, when the input signal is synchronized with the fundamental frequency of oscillation of the oscillator.

Referring now again to the signal appearing at junction 56, it is to be noted that the signal now passes to the base 12$b$ of transistor amplifier 12. However, the RF carrier frequency is filtered out of the complex signal by means of the capacitor 62 and RF choke 58, which act as a filter network. At frequencies in the range of 300 mHz., the capacitor 62 acts as an RF bypass capacitor to ground and the choke 58 prevents any RF signal component from passing therethrough. Thus, the remaining signal comprises the mid-range audio frequency component and the low frequency component and is coupled to the base 12$b$ by means of the coupling capacitor 60.

It is herein to be noted that the signal now appearing at the base 12$b$ appears to be to the mid-range audio frequency component, as a carrier wave, and the low frequency component, as a modulating signal.

The audio frequency component which, as discussed hereinbefore, has a frequency of from 10–20 kHz., is actually impressed across the base to emitter circuit of the transistor amplifier 12, since at the audio frequencies specified the choke 28 appears to be a short circuit, thereby effectively connecting the emitter 12*e* to ground and transferring the transistor amplifier 12 into a grounded emitter configuration. It will also be appreciated that at these audio frequencies, the capacitor 36 appears as an open circuit to disconnect the base from ground, as distinguished with its function at RF frequencies where the capacitor acted as a short circuit.

The signal presented between the base and emitter circuit is then amplified by transistor 12 and appears as the output thereof on the collector 12*c*, and more particularly between the collector and emitter 12*e* which is connected to ground.

Since the highest frequency component of the signal appearing at the collector 12*c* is now in the audio frequency range, the capacitor 24 appears as an open circuit and choke 26 appears as a short circuit, whereby the output signal at collector 12*c* is now impressed across resistor 17 which acts as a load resistor for the amplifier 12. The signal impressed across load resistor 17 is then coupled via capacitor 66 as an input signal to the base 64*b* of the amplifier 14 connected in a grounded emitter configuration. The amplified signal is then presented upon the collector 64*c*, across load resistor 76, from where it is fed to a wave shaping or filtering network comprising the parallel combination of capacitors 78 and 80. The shaped or filtered signal which is then present at junction 82 is fed to the series tuned circuit comprising the capacitor 84 and inductor 86. The tuned circuit is tuned to the precise frequency of the audio frequency component of the signal, whereby the signal is effectively amplified thereby and then fed to the base 88*b* of the transistor amplifier 88 through a voltage dividing network comprising the resistors 90 and 100 and capacitor 92.

It is herein to be noted that the coil or inductor 86 has a capacitor 87 connected in parallel thereacross, the purpose of which is to compensate for any capacitance variations which may exist between different inductors 86 having the same inductance ratings.

It is also to be noted that the resistor 90, as well as serving as part of a voltage divider, serves to isolate the amplified voltage appearing at the junction 89 from the base 88*b* so as to provide, in conjunction with resistor 100, the correct driving signal to amplifier 88 to prevent the amplifier from being overdriven. The amplifier also includes a resistor 104 which is effectively connected between the emitter 88*e* and base 88*b* to provide negative feedback to the amplifier.

The amplified signal is then presented at collector 88*c* and across the load resistor 96 from whence it is fed to the demodulating circuit comprising the demodulating diode 106 and circuit comprising the parallel combination of the resistor 108 and capacitor 110. The demodulated signal comprising only the low frequency components is then present at the junction 112 from where it is then fed to activate what may be generally termed the receiver output circuit and which will now be described in detail.

The receiver output circuit comprises the first output circuit 8 and the second output circuit 9.

Figure 3:
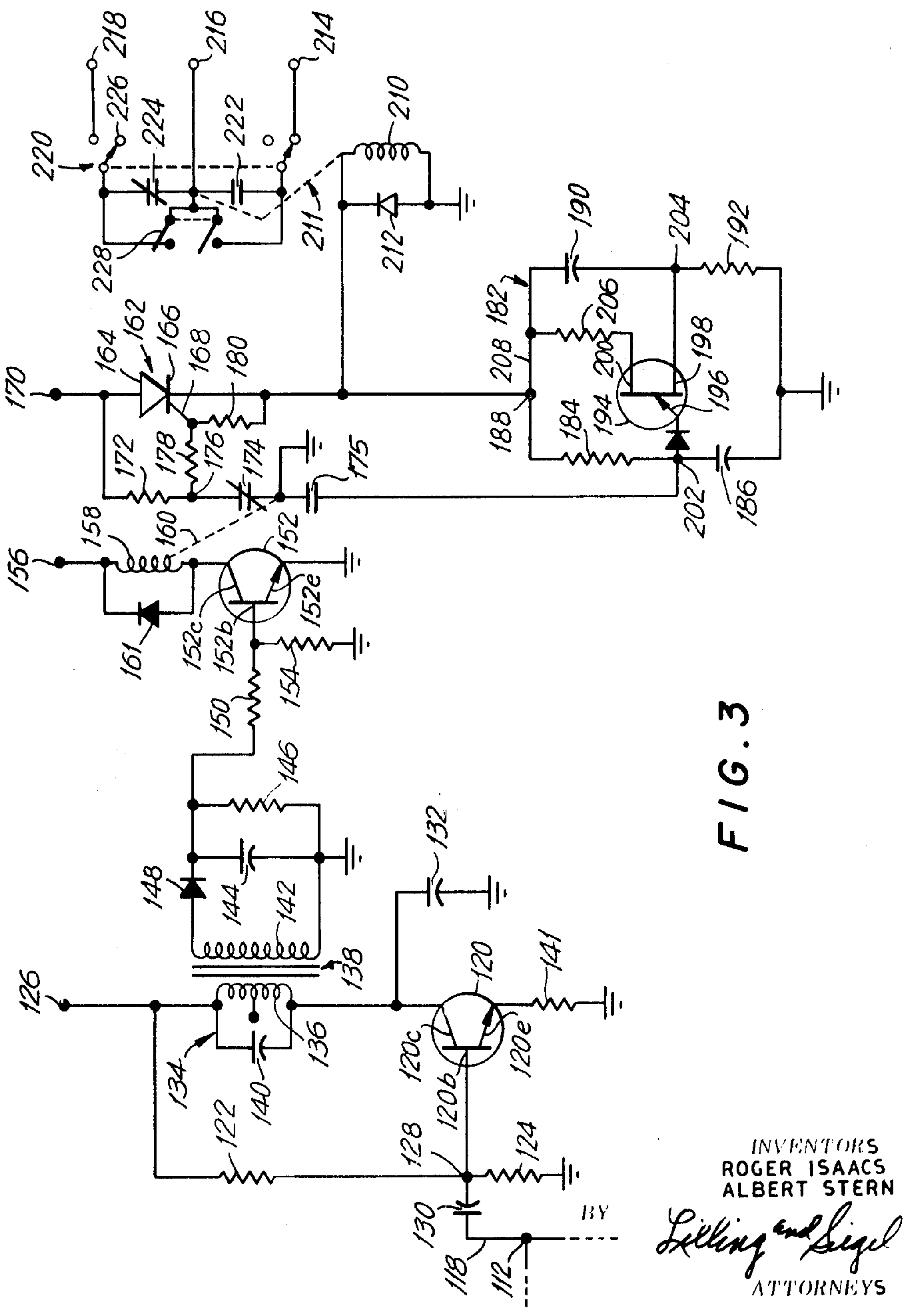
FIG. 3 is a schematic representation of one of the associated output circuits connected to the receiver portion for controlling the operation of a heating and cooling system connected as the output load of the depicted associated output circuit.

With reference now to FIG. 3 and the output circuit 8, the junction 112 is connected to the circuit 8 via a lead line 118. The output circuit 8 includes a transistor amplifier 120 having a base 120*b*, an emitter 120*e* and a collector 120*c*. A bias potential is supplied to the base 120*b* by means of a voltage divider comprising resistors 122 and 124 connected between a B+ supply 126 and ground. The junction 128 between the resistors 122 and 124 being connected to the base 120*b* and to the lead line 118 through a coupling capacitor 130.

The collectors 120*c* is connected to ground through a capacitor 132 and is also connected to the B+ supply 126 via a parallel tuned tank 134 comprising the parallel combination of the primary coil 136 of a transformer 138 and a capacitor 140. The emitter 120 is connected to ground through a feedback resistor 141. The secondary coil 142 of the transformer is connected across the parallel combination of a capacitor 144 and resistor 146 through a diode rectifier 148. The diode output, and thus the capacitor 14, is in turn connected through a resistor 150 to the base 152*b* of transistor 152, which base is connected to ground through another resistor 154.

The emitter 152*e* is connected directly to ground while the collector 152*c* is connected to a B+ supply 156 through the relay coil 158 of a relay 160. A negatively poled diode 161 is connected in parallel across coil 158. The circuit 8 also includes a silicon controlled rectifier 162, commonly termed an SCR which includes an anode 164, a cathode 166 and a gate 168. The anode 164 is connected to a B+ source 170 and also through a resistor 172 and the normally closed contacts 174 of the relay 160 to ground. The junction 176 between the resistor 172 and the contacts 174 is connected to the gate 168 through a resistor 178 and the gate 168 is connected through a resistor 180 to the cathode 166.

The cathode 166 is connected to a timing circuit generally designated 182. The timing circuit 182 includes a series connected resistor 184 and capacitor 186 which are connected between a junction point 188 and ground. Another series connected capacitor 190 and resistor 192 is also connected between junction 188 and ground, in parallel with the series combination of resistor 184 and capacitor 186.

The timing circuit 182 also includes a unijunction transistor 194 having an emitter 196 and first and second bases 198 and 200, respectively. The emitter 196 is connected through a diode 201 to the junction point 202 between resistor 184 and capacitor 186. The first base 198 is directly connected to the junction point 204 between capacitor 190 and resistor 192 while the second base 200 is connected by means of a resistor 206 to a conductor 208, or effectively to the junction 188. The junction 202 is also connected to the normally open contacts 175 of relay 160, which contacts are also connected to ground.

The cathode 166 is also connected to one end of the relay coil 210 of a relay 211, the other end of the coil being connected to ground. A negatively poled diode 212 is also connected between the cathode 166 and ground and in parallel with the coil 210.

As seen in FIGS. 1 and 3, the ultimate load of output circuit 8 is a heating and cooling system 10 having terminals 214, 216 and 218, which terminals are connected to a source of potential by the relay actuated switch 220 controlled by the relay 210, as will appear more fully hereinafter.

The terminal 214 and its associated lead are connected to the heating system and terminal 218 and its associated lead are connected to the cooling system while the terminal 216 and its associated lead is common and is connected to both the heating and cooling systems.

In the drawing, the switch 220 is illustrated as being connected to the heating system for winter operation. The normally open contacts 222 of relay 211 are thus effectively connected between the heating terminal 214 and the common terminal 216 while the normally closed contacts 224 are connected between the common terminal and an open or non-connected terminal 226.

An override switch 228 is connected across the relay contacts 222 and 224 so as to permit the heating or cooling system to be manually turned on in case of any emergency conditions. Thus, should the system fail, switch 228 will permit the system to be normally operative to supply heat or cooling.

With reference to the operation of the output circuit 8, it is herein to be noted that a low frequency signal component has been presented at junction 112 and for purposes of illustration, it will be assumed that the particular frequency is 200 hertz. Of course, the signal is a pulse signal having a pulse repetition frequency or PRF which is variable whereby there is an intermittent signal presented to the junction 112 due to the fact that the signal originally received by the antenna 32 is one which is intermittent.

The 200 hertz signal present at junction 112 is coupled via capacitor 130 to the base 120*b* of transistor 120 and will drive the transistor into a conductive state. The output of the transistor will appear across the tank 134 and more particularly across primary coil 136.

It is herein to be noted that the tank 134 is tuned to a frequency of 200 hertz whereby the output of the transistor will appear across the coil 136 only if the input signal applied to base 120*b* is of substantially the same frequency as that to which the tank 134 is tuned.

The voltage produced across coil 136 is coupled by the transformer 138 to the secondary coil 142 and is rectified by diode 148 and applied across capacitor 144 charging the same. The signal then appearing across capacitor 144 is then fed via resistors 150 and 154 to the base 152*b* of transistor 152, and more particularly across the base to emitter circuit thereof to cause conduction of transistor 152. At the same time capacitor 144 is discharging itself through resistors 150 and 154 and 146.

Referring now to the SCR 162 it will be seen that with the contacts 174 of relay 160 closed, current flows from source 170 through resistor 172 and contacts 174 to ground. There is substantially no current flow through resistor 178 to the gate 168 of SCR 162 so that the SCR is in an off state and no current flows from the anode 164 to the cathode 166 thereof.

Conduction of transistor 152 results in current flow through the relay coil 158 thereby energizing relay 160 and causing the normally closed contacts 174 to open and the normally open contacts 175 to close. Opening of the contacts 174 results in the junction 176 no longer being clamped to ground, whereupon current flows through resistor 178 to the gate 168 of the SCR 162 causing it to fire. When the SCR fires, current flows from the anode 164 to the cathode 166 and thus there is current flow through the coil 210 of the relay 211 causing activation of the relay whereupon the normally open contacts 222 will close and the normally closed contacts 224 will open. Closing of contacts 222 completes the circuit between terminals 214 and 216 and renders the heating system operative.

It is herein to be noted that the pulse applied to the transistor 152 has a very low PRF, normally in the order of one per minute so that when no further pulse is present at base 152*b*, the transistor 152 stops conducting whereupon current ceases to flow through coil 158 and the relay snaps back into its de-energized position with contacts 174 closed and contacts 175 open. Thus, there is no further current being fed to the gate 168; however, current flow through the SCR 162 will continue until the same is back biased. Therefore, since SCR 162 is maintained in its turned on state current will continue to flow therethrough and through the coil 210 of relay 211 to maintain the heating system in an operative condition.

With reference now to the timing circuit 182, as soon as the contacts 175 return to their normally open position, the junction 202 and thus capacitor 186 are no longer clamped to ground, whereupon the current flow through the SCR 162 to junction 188 commences to charge the capacitor 190. The values of the capacitor 190 and resistor 192 are chosen so that their time constant is extremely short so that the capacitor 190 is almost instantaneously charged to the potential of the $B^+$ source 170 upon conduction of SCR 162. Concomitantly with the charging of capacitor 190, and as soon as the contacts 175 are opened so that junction 176 is no longer clamped to ground, capacitor 186 commences to charge in dependence upon the timing constant of the curve defined by the capacitor 186 in conjunction with the resistor 184, which time constant is appreciably greater than that defined by the capacitor 190 and resistor 192. The charging of capacitor 186 continues until the voltage thereacross is such that it provides a bias potential on emitter 196 which is sufficient to forward bias the emitter 196 to first base 198 circuit to cause conduction therethrough. It will be apparent, therefore, that the time required to initiate conduction of the unijunction transistor 194 is a function of the time constant curve of the resistor 184 and capacitor 186; whereby the values of these components may be selected so as to achieve the desired charging period, which period becomes the period of operation of the timing circuit 182.

Since the resistor 192 is connected at junction 204 between the base 198 and ground, conduction of the transistor 194 between its emitter and first base circuit, as described hereinabove, will cause the capacitor 186 to be connected across the resistor 192 and to discharge therethrough. The discharge of capacitor 186 is deemed the output pulse of the timing circuit 182 and causes the voltage on emitter 196 to be decreased whereupon conduction between the emitter 196 and the first base 198 ceases.

As previously noted, the capacitor 190 had been charged to the potential of the voltage source 170, therefore, when the capacitor 186 discharges through the resistor 192, it produces a positive voltage pulse which will be in "series addition" with the voltage stored on the capacitor 190. At this time, the voltage appearing at junction 188 of the timing circuit 182, and thus at the cathode 166 of the SCR 162, is more positive than the $B^+$ source voltage present at the anode 164 of the SCR 162 and thus back biases the SCR causing the same to be turned off. Turning off the SCR 162 results in the cessation of current flow through the coil 210 of the relay 211, whereupon the relay is de-energized and the contact 224 snaps back to its closed position while the contact 222 snaps back into its open position, thereby opening the circuit between the terminals 214 and 216 so that the heating system is switched into a deactivated condition.

It is herein to be noted that after the application of the incoming pulse from the junction 112 to the base 152*b* the heating system remains operative for a period of time determined by the timing circuit 182, even though the duration of the signal pulse is extremely short and significantly less than the timing period of the timing circuit 182. Thus, the timing circuit 182 is adapted to deactivate the heating system a predetermined time after the activation thereof, provided no further input signal appears at junction 112. If another pulse is received at the junction 112 and fed to the base 152*b*, prior to the time that the SCR 162 is turned off, as previously described, then the contacts 175 will be snapped into a closed position and will clamp the junction 202 and capacitor 186 to ground. This will cause the capacitor to discharge, whereupon the circuit 182 will again commence its timing operation, which occurs when the signal pulse ceases and the contacts 175 are again returned to their normally open position.

It is also to be noted that the relay coils 158 and 210 are provided with diodes 161 and 212, respectively, in parallel therewith which diodes prevent any transient surges from burning out the transistor 152 and SCR 162, respectively.

It will be appreciated that although the output circuit 8 has been described in conjunction with the operation of the heating system, the operation will be substantially the same if the switch 220 is activated to place the colling system in-line with the contracts 222 and 224.

If for any reason an emergency condition should arise, then the override switch 228 can be activated and the operating system then in-line will be shorted to render the system normally operative.

Figure 4:
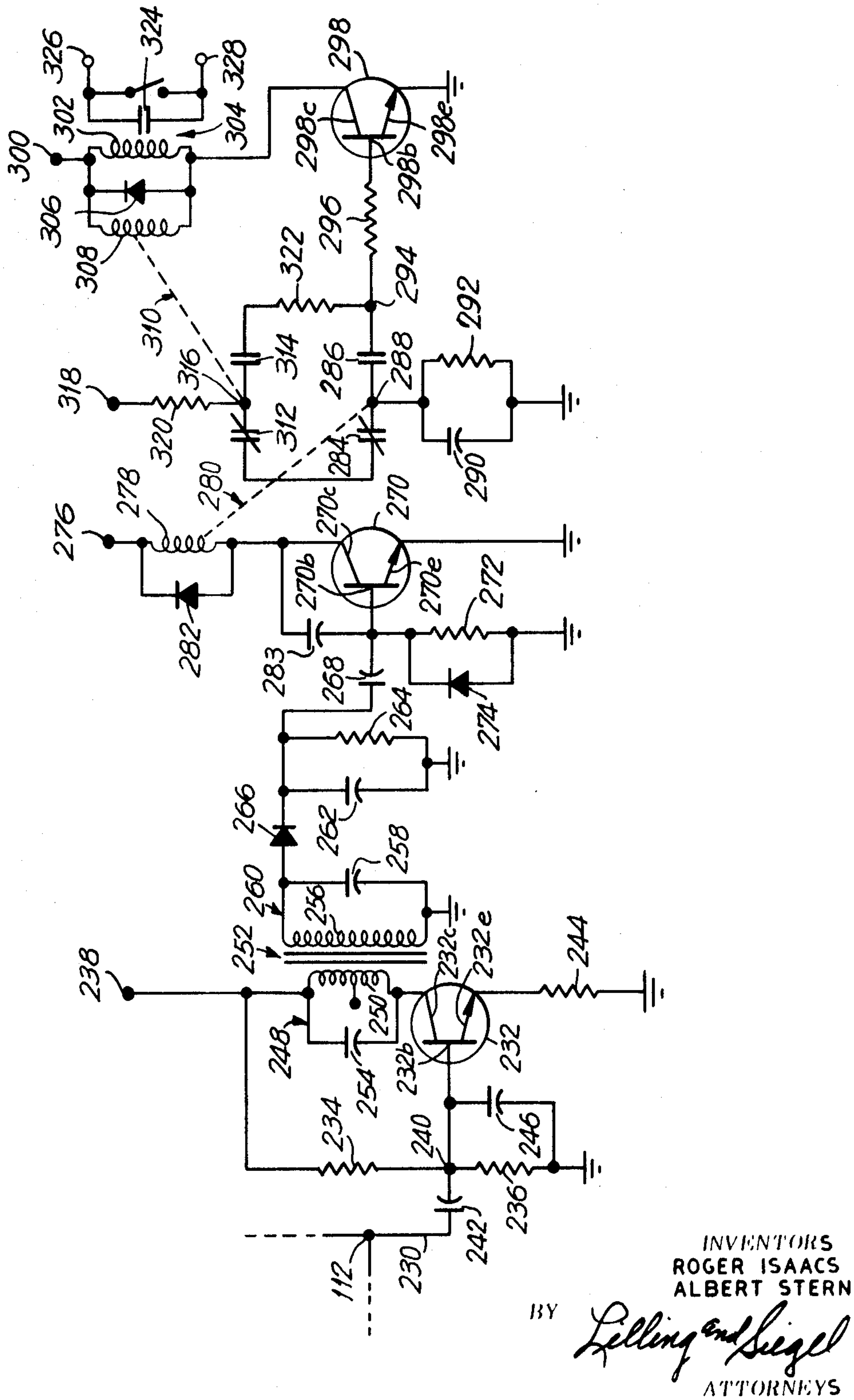
FIG. 4 is a schematic illustration of the other of the associated output circuits connected to the receiver portion for conrolling the operatiton of a fan which forms a part of the heating and cooling sysem but which is operable separate and apart therefrom.

Referring now to FIG. 4 and to the output circuit 9, the junction 112 is connected to the circuit 9 via a lead line 230. The output circuit 9 includes a transistor amplifier 232 having a base 232*b*, an emitter 232*e* and a collector 232*c*. A bias potential is supplied to the base 232*b* by means of a voltage divider comprising resistors 234 and 236 which resistors are connected between a B+ supply 238 and ground with the junction 240 between the resistors being connected to the base 232*b* and to the lead line 230 through a coupling capacitor 242.

The emitter 232*e* is connected to ground through a feedback resistor 244 and capacitor 246 is connected in parallel across the resistor 236. The collector 232*c* is connected to B+ supply 238 via a parallel tuned tank 248 comprising the parallel combination of the primary coil 250 of a transformer 252 and a capacitor 254. The secondary coil 256 of the transformer has a capacitor 258 connected in parallel therewith which capacitor in conjunction with the secondary coil forms a parallel resonant tank 260 tuned to the same frequency as that of tank 248. The ouput of tank 260 is connected across the parallel combination of a capacitor 262 and a resistor 264 through a diode rectifier 266. The ouput from diode 266, and thus the capacitor 262, is connected through the capacitor 268 to the base 270*b* of transistor 270, which base is connected to ground through a resistor 272 having a negatively poled diode 274 connected thereacross. The emitter 270*e* is connected to ground while the collector 270*c* is connected to a B+ source 276 through a relay coil 278 of a relay 280; the coil 278 has a negatively poled diode 282 connected in parallel therewith. A capacitor 283 is interconnceted between the base 270*b* and the collector 270*c*.

The relay 280 has normally closed contacts 284 and normally open contacts 286 whose common junction 288 is connected to ground through the parallel combination of a capacitor 290 and a resistor 292. The contacts 286 are also connected to a junction point 294 which junction is connected through a resistor 296 to the base 298*b* of a transistor 298 also having an emitter 298*e* connected to ground and a collector 298*c*. The collector 298*c* is connected to a B+ source 300 through the parallel combination of a relay coil 302 of a relay 304, a negatively poled diode 306 and a relay coil 308 of a relay 310.

The relay 310 has normally closed contacts 312 and normally open contacts 314 whose common junction 316 is connected to a B+ source 318 through a resistor 320. The contacts 312 are directly connected to the contacts 284 of relay 280 while the contacts 314 are connected to the junction 294 through the resistor 322.

The relay 304 has single contacts 324 which are normally open. The contacts 324 are connected in series between the terminals 326 and 328 of a fan which is connected with the heating and cooling system, previously discussed, but which is separably operable apart therefrom, as will be discussed in detail hereinafter. The fan is activated by closing of the contacts 324 and has an override switch 328 connected in parallel across the contacts 324 so as to short circuit the fan to render the same operative in case of any emergency situation.

With regard to the operation of the output circuit 9, it is herein to be noted that the signal transmitted to and adapted to be received by the receiver circuit assembly of the present invention, for activation of the circuit 9, contains a low frequency component different from the frequency to which circuit 8 is tuned. By way of example, the frequency of this low frequency component may be 100 hertz, while that to which circuit 8 is tuned may be 200 hertz. Thus, when it is desired to activate the circuit 9, and more particularly the fan 11 connected as the load thereto, a complex signal having a 100 hertz component will be transmitted to and received by the receiver circuit assembly 6 and the 100 Hz. signal will appear at the junction 112.

The 100 hertz signal is coupled via capacitor 242 to the base 232*b* of the transistor 232 and will cause the transistor to conduct. It is herein to be noted that the capacitor 246 acts as a filter to attenuate any frequency signal in excess of 100 Hz.

When transistor 232 conducts, an output signal appears across the tank 248 and since the tank is tuned to 100 Hz., all other frequencies will be attenuated thereby so that the signal appearing across coil 250 and coupled to the coil 256 will be only that signal component having the desired frequency. Moreover, the secondary coil 256 is tuned by means of capacitor 258 to form a secondary resonant tank circuit also tuned to 100 Hz. which further attenuates all other frequency components other than the desired 100 Hz. signal.

The signal appearing across the tank circuit 260 is fed to diode 266 which rectifies the signal and the rectified output signal is applied across capacitor 262 and charges the capacitor. The voltage appearing across capacitor 262 is then discharged through capacitor 268 and resistor 272 and resistor 264. The time constant of capacitor 268 in conjunction with resistor 272 is chosen to be relatively small as compared to that of the capacitor 262 and resistor 264, so that the discharge path of capacitor 262 is through resistor 272 as opposed to resistor 264, whereby a short duration pulse is produced across capacitor 268 and thus resistor 272.

The pulse produced across resistor 272 drives transistor 270 into conduction causing current to flow through the relay coil 278. At this time, it is to be noted that prior to conduction of transistor 270, the contacts 284 and 312 are closed whereby the source 318 has charged capacitor 290 to the potential thereof and the charge remains stored on capacitor 290 is applied to the base 298 and impressed able to the capactior.

When current flows through coil 278, it activates its associated contacts. More particularly, the normally open contacts 286 are closed and the normally closed contacts 284 are opened. Upon closure of contacts 286, the voltage on capacitor 290 is applied to the base 298 and impressed across the base to emitter circuit, 298*b* to 298*e*, of transistor 298, thus biasing the transistor into a conductive state. Conduction of transistor 298 causes the capacitor 290 to discharge through the base to emitter circuit and concomitantly therewth causes current flow from source 300 to collector 298*c* which produces current flow through relay coil 302 of relay 304 and relay coil 308 of relay 310. Current flow through coil 302 closes contacts 324 and completes the circuit from terminal 326 to terminal 328 so that the fan is turned on. Current flow through the coil 308 closes the contacts 314 and opens the contacts 312. At the time contacts 314 have closed the pulse across coil 278 of relay 280 has expired and the contacts 284 have once more closed while contacts 286 have opened. Thus, current will flow directly from source 318 through contacts 314, and resistors 322 and 296 to the base 298*b* to maintain the transistor 298 in a conductive state.

It will be appreciated that the current must flow in the manner above described since contacts 286 have been returned to their normally opened state whereby no current can flow from source 318 to capacitor 290. Thus, the capacitor 290 remains in a completely discharged or uncharged state while transistor 298 remains fully conductive due to the direct current flow to the base 298*b* thereof from source 318 and, also, the fan remains turned on.

Upon the reception of the next 100 Hz. pulse at junction 112, a pulse is again presented across coil 278 causing the contacts 286 to close and contacts 284 to open. Thus, the capacitor 290 is connected through contacts 286, resistor 322, contacts 314 and resistor 320 to the source 318, whereupon the capacitor 290 will try to recharge and since capacitor 290 is completely discharged there will momentarily be a short circuit from source 318 through capacitor 290 to ground, whereupon all current flow will be through the capacitor. Therefore, the current which was flowing through resistor 296 to base 298*b* will cease and the transistor 298 will become non-conductive ceasing the current flow through the relay coils 302 and 308. This will cause the contacts 324 to open and turn off the fan and will also cause the contacts 312 to close and contacts 314 to open. At this time the pulse across coil 278 will have already expired and contacts 284 will have closed and 286 will have opened, whereby the transistor 298 will remain in an off or non-conductive state and capacitor 290 will have been charged once more to the potential of source 318 by virtue of the fact that contacts 284 and 312 were both returned to a closed position.

It will, therefore, be appreciated that the transistor 298 and its associated components is, in effect, a bistable electro mechanical flip-flop. Thus, as will appear from our copending application entitled "Portable and Wireless Remote Control Thermostatic Apparatus," Ser. No. 864,499, filed Oct. 7, 1969, a button may be pressed to initiate the transmission of a 100 Hz. signal which will alternatively turn the fan on and off independent of the operation of the heating and cooling system which is dependent upon the reception of a 200 Hz. signal for the operation thereof.

It is herein to be noted that although the output circuit is highly selective to attenuate all other frequencies other than 100 Hz. to prevent false activation thereof, output circuit 8 may have some 100 Hz. signal component passing therethrough, however, the magnitude of the 100 Hz. signal will be extremely small and will be unable to initiate conduction of transistor 152 to activate the heating and cooling system. It is also to be noted that the capacitor 132 connected to collector 120*c* of the circuit is effective to attenuate all other frequencies other than 200 Hz., to which tank 134 is tuned.

It will be appreciated that although we have shown and referred to a multitude of B+ source terminals in the foregoing description, in actual practice only several various potentials are required and these may be obtained by utilizing common buses connected to a regulated power supply.

It is thus seen that we have provided a new and novel receiver circuit assembly adapted for use in conjunction with remote control apparatus for controlling the operation of a heating and control system and for independently controlling the operation of a fan forming a separabale part of the heating and cooling system. We have also provided a new and novel electro-mechanical flip-flop circuit for particular use in conjunction with the control of the fan.

Although we have shown and described the preferred embodiments of our invention, it will be apparent to those skilled in the art that there are many modifications, changes and improvements which may be made therein without departing from the spirit and scope thereof as defined in the appended claims.

What is claimed is:

1. A receiver circuit assembly for use with wireless remotely disposed heating and cooling systems, said assembly comprising
- a receiver,
- a first output circuit connected to said receiver and responsive to a first predetermined frequency,
- a second output circuit connected to said receiver and responsive to a second predetermined frequency,
- a heating and cooling system connected to said first output circuit as the load thereof, and
- a fan connected to said second output circuit as the load thereof,
- said receiver being operable to produce an output signal having one of said first and second predetermined frequencies upon the reception of an input signal thereto,
- said first output circuit being operable upon the application of said output signal from said receiver at first predetermined frequency to activate said heating and cooling system, and
- said second output circuit being operable upon the application of said output signal from said receiver at said second predetermined frequency to variably activate and inactivate said fan.

2. A receiver circuit assembly in accordance with claim 1, wherein
- said receiver is operable to receive a double modulated RF carrier signal having a low frequency modulating signal and to demodulate said carrier signal to produce said low frequency modulating signal as the output signal thereof.

3. A receiver circuit assembly in accordance with claim 2, wherein
- said double modulated RF carrier signal comprises an RF carrier wave component, mid-range audio frequency component and a low frequency component, and wherein
- said receiver includes means to demodulate said double modulated RF carrier signal to produce said low frequency component as the sole output signal thereof.

4. A receievr circuit assembly in accordance with claim 1, wherein
- said first output circuit includes means to activate said heating and cooling system for a predetermined period of time upon the application of said output signal from said receiver to said first output circuit.

5. A receiver circuit assembly in accordance with claim 4, wherein
- said activation means is operable to deactivate said heating and cooling system after said predetermined period of time in the absence of another output signal from said receiver at said first predetermined frequency and operable upon the applicaiton of another said output signal to maintain said heating and cooling system activated for said predetermined period of time thereafter.

6. A receiver circuit assembly in accordance with claim 1, wherein
- said second output circuit includes means for alternately switching said fan between an activated and an inactivated condition in dependence upon the application of successive output signals from said receiver to said second output circuit.

7. A receiver circuit assembly in accordance with claim 6, wherein
- said switching means comprises a bistable electromechanical flip-flop arrangement.

8. A receiver circuit assembly in accordance with claim 1, wherein
- said second output circuit comprises
  - an input stage, and
  - an output stage,
- said fan being connected as a load to said output stage, and
- said input stage including frequency selective means to pass to said output stage substantially only those output signals from said receiver whose frequency is said second predetermined frequency.

9. A receiver circuit assembly in accordance with claim 8, wherein
- said input stage includes
  - a first transistor having first, second and third terminals,
  - a transformer having primary and secondary coils, and
  - a potential source,
- said second and third terminals being adapted to have said receiver output signal applied thereacross and to produce a transistor output signal across said first and third terminals,
- said frequency selective means including said transformer,
- said primary coil being connected between said potential source and said first terminal,
- said frequency selective means also including a capacitor connected in parallel across said primary coil and forming therewith a resonant circuit tuned to said second predetermined frequency, and
means for connecting said secondary coil to said output stage.

10. A receiver circuit assembly in accordance with claim 9, including
a second capacitor connected in parallel across said secondary coil and forming therewith a second resonant circuit tuned to said second predetermined frequency, and
said first resonant circuit and said second resonant circuit comprising said frequency selective means.

11. A receiver circuit assembly in accordance with claim 10, wherein
said first transistor terminal is the collector,
said second transistor terminal is the base, and
said third transistor terminal is the emitter.

12. A receiver circuit assembly in accordance with claim 11, wherein
said output stage comprises
switching means, and
a bistable electromechanical flip-flop circuit,
said fan being connected as a load to said flip-flop circuit,
said flip-flop circuit having a first stable state rendering said fan operative and a second stable state rendering said fan inoperative,
said switching means being operable upon the application of said first transistor output signal at said second predetermined frequency to switch said flip-flop circuit between said first and second stable states, whereby successive signals to said output stage alternately switch said flip-flop circuit between said first and second stable states to thereby variably activate said fan in dependence upon the condition of said flip-flop circuit.

13. A receiver circuit assembly in accordance with claim 1, wherein
said second output circuit includes
an input stage,
an intermediate stage, and
an output stage,
said fan being connected as a load to said output stage,
said input stage including frequency selective means to pass to said intermediate stage substantially only those output signals from said receiver whose frequency is said second predetermined frequency,
said output stage having an activated and an inactivated condition,
said intermediate stage being operable upon the application of a signal from said input stage at said second predetermined frequency to switch said output stage between said activated and inactivated conditions, whereby successive signals to said intermediate stage alternately switch said output stage between said activated and inactivated conditions to thereby variably activate said fan in dependence upon the condition of said output stage.

14. A receiver circuit assembly in accordance with claim 13, wherein
said fan is activated when said output circuit is in its activated condition and inactivated when said output circuit is in its inactivated position.

15. A receiver circuit assembly in accordnce with claim 13, wherein
said input stage includes
a first transistor having first, second and third terminals,
a transformer having primary and secondary coils, and
a potential source,
said second and third terminals being adapted to have said receiver output signal applied thereacross and to produce a transistor output signal across said first and third terminals,
said frequency selective means including said transformer,
said primary coil being connected between said potential source and said first terminal,
said frequency selective means also including a capacitor connected in parallel across said primary coil and forming therewith a resonant circuit tuned to said second predetermined frequency, and
means for connecting said secondary coil to said intermediate stage.

16. A receiver circuit assembly in accordance with claim 15, including
a second capacitor connected in parallel across said secondary coil and forming therewith a second resonant circuit tuned to said second predetermined frequency, and
said first resonant circuit and said second resonant circuit comprising said frequency selective means.

17. A receiver circuit assembly in accordance with claim 16, wherein
said first transistor terminal is the collector,
said second transistor terminal is the base, and
said third transistor terminal is the emitter.

18. A receiver circuit assembly in accordance with claim 17, wherein
said intermediate stage includes
a second transistor having first, second and third terminals,
a relay, and
a potential source,
said second and third terminals being adapted to have the output signal of said first transistor applied thereacross and to produce an output signal across said first and third terminals when said first transistor output signal is at said second predetermined frequency,
said relay comprising
a coil,
a pair of normally closed contacts, and
a pair of normally open contacts,
said normally closed and said normally open contacts having a common junction therebetween connected to one of each of said pair of contacts,
a third capacitor connected between said common junction and a ground terminal,
said third capacitor being adapted to be connected to charging means through said normally closed contacts and adapted to be connected to said output stage through said normally open contacts,
said relay coil being connected between said potential source and said first terminal, whereby said output signal across said first and third terminals activates said relay to close said normally open contacts and open said normally closed contacts and causes said third capacitor when in a charged condition to discharge through said normally open contacts to thereby switch said output stage from an inactivated condition to an activated position.

19. A receiver circuit assembly in accordance with claim 18, wherein
said first terminal of said second transistor is the collector,
said second terminal of said second transistor is the base, and
said third terminal of said second tarnsistor is the emitter.

20. A receiver circuit assembly in accordance with claim 19, wherein
said output stage includes
a third transistor having first, second and third terminals,
a second relay,
a third relay, and
a potential source,
said second and third terminals being adapted to have a signal applied thereacross and to drive said transistor into a conductive state in response thereto, said first and third terminals being adapted to produce an output thereacross when said transistor is in said conductive state,
said second relay comprising
a coil, and
a pair of contacts,
said second relay contacts being connected in series with said fan,
said second relay coil being connected between said last mentioned potential source and said first terminal,
said third relay comprising
a coil,
a pair of normally closed contacts, and
a pair of normally open contacts,
said normally closed and said normally open contacts having a common junction therebetween connected to one of each of said pairs of contacts,
said charging means including a voltage source connected to said last mentioned common junction,
the other of said contacts of said normally closed contacts of said third relay being connected to the other of said contacts of said first mentioned normally closed contacts, and
the other of said contacts of said normally open contacts of said third relay being connected to the other of said contacts of said first mentioned normally open contacts and to said second terminal.

21. A receiver circuit assembly in accordance with claim 20, wherein
said first terminal of said third transistor is the collector,
said second terminal of said third transistor is the base, and
said third terminal of said third transistor is the emitter.

22. A receiver circuit assembly in accordance with claim 21, wherein
said second relay contacts are normally open.

23. A receiver circuit assembly in accordance with claim 1, wherein
said first output circuit comprises
an input stage, and
an output stage,
said heating and cooling system being connected as a load to said output stage, and
said input stage including frequency selective means to pass to said output stage substantially only those output signals from said receiver whose frequency is said first predetermined frequency.

24. A receiver circuit assembly in accordance with claim 23, wherein
said input stage includes
a first transistor having first, second and third terminals,
a transformer having primary and secondary coils, and
a potential source,
said second and third terminals being adapted to have said receiver output signal applied thereacross and to produce a transistor output signal across said first and third terminals,
said primary coil being connected between said potential source and said first terminal,
said frequency selective means comprising said primary coil and a capacitor connected in parallel across said primary coil and forming therewith a resonant circuit tuned to said first predetermined frequency, and
means for connecting said secondary coil to said output stage.

25. A receiver circuit assembly in accordance with claim 24, wherein
said output stage comprises
a triggering device,
a trigger activating switch, and
a load activating switch,
means connecting said input stage to said trigger activating switch,
means connecting said trigger activating switch to said triggering device,
means connecting said triggering device to said load activating device, and
means connecting said load activating device to said load,
said trigger activating switch being adapted to be actuated upon the application of an output signal from said input stage at said first predetermined frequency, and
actuation of said trigger activating switch actuating said triggering device and said load activating switch to thereby activate said load.

26. A receiver circuit assembly in accordance with claim 25, wherein
said output stage includes a timing circuit,
means connecting said timing circuit to said triggering device,
said timing circuit being operative upon the actuation of said triggering device to commence its timing cycle and operative upon the completion of its timing cycle to deactuate said triggering device and said load activating switch to thereby inactivate said load.

27. A receiver circuit assembly in accordance with claim 26, wherein
said timing circuit is reset to commence its timing cycle upon the application of another signal to said trigger activating switch during said initial timing cycle and prior to the completion thereof so as to maintain said load in an activated condition.

28. A receiver circuit assembly in accordance with claim 26, wherein
said trigger activating switch includes
a second transistor having first, second and third terminals, and
a potential source,
said potential source being connected to said first terminal,
said second and third terminals being adapted to have the output signal of said first transistor applied thereacross and to produce an output signal across said first and third terminals when said first transistor output signal is at said first predetermined frequency.

29. A receiver circuit assembly in accordance with claim 28, wherein
said triggering device is an SCR comprising
an anode,
a cathode, and
a gate,
a voltage source connected to said anode,
said means connecting said trigger activating switch to said triggering device comprising a relay including
a coil, and
a pair of normally closed contacts,
said coil being connected between said potential source and the first terminal of said second transistor,
said normally closed contacts being connected between said voltage source and a ground terminal, and
means connecting said gate to said voltage source and to one of the pair of said normally closed contacts, whereby when said second transistor conducts current flows through said relay coil causing said normally closed contacts to open to thereby cause current flow to the gate of said SCR causing the same to fire.

30. A receiver circuit assembly in accordance with claim 29, wherein
said load activating switch comprises a second relay including
a coil,
a pair of normally closed contacts, and
a pair of normally open contacts, said second relay coil being connected between said cathode and a ground terminal, and
said normally closed and normally open contacts being connected across said load and being adapted to activate the same upon opening of said normally closed contacts and closing of said normally open contacts,
whereby firing of said SCR causes current flow through said second relay coil causing said normally closed contacts to open and said normally open contacts to close to thereby activate said load.

31. A receiver circuit assembly in accordance with claim 30, wherein
said timing circuit is connected between the cathode of said SCR and a ground terminal, and
said timing circuit is operable upon the firing of said SCR to commence its timing cycle and operative upon completion of its timing cycle to cause said SCR to cease conducting to thereby inactivate said load.

32. A receiver circuit assembly in accordance with claim 31, wherein
said timing circuit is reset to commence its timing cycle upon the application of another signal to the gate of said SCR during said initial timing cycle and prior to the completion thereof so as to maintain said load in an activated condition.

33. A receiver circuit assembly in accordance with claim 32, wherein
said first mentioned relay includes a pair of normally opened contacts,
said first mentioned normally opened and normally closed contacts having a common junction therebetween connected to one of each of said pairs of contacts and to a ground terminal,
said timing circuit comprising
a unijunction transistor having
an emitter,
a first base, and
a second base,
a first series connected resistance-capacitance circuit, and
a second series connected resistance-capacitance circuit,
said first resistance-capacitance circuit being connected between the cathode of said SCR and a ground terminal with the resistance being connected to said SCR cathode and said capacitance being connected to ground,
the junction between said resistance and capacitance being connected to ground through said normally open contacts of said first relay,
said second resistance-capacitance circuit being connected between the cathode of said SCR and ground with the capacitance being connected to said SCR cathode and the resistance being connected to ground,
the junction between said last mentioned resistance and said last mentioned capacitance being connected to said first base, and
a resistor connected between said second base and said SCR cathode.

34. A receiver circuit assembly in accordance with claim 1, wherein said receiver is adapted to receive a double modulated carrier signal having a high frequency component, a mid-frequency component and a low frequency component,
said receiver comprising
an input stage,
a first intermediate stage,
a second intermediate stage, and
an output stage,
first means connecting said first intermediate stage to said input stage,
second means connecting said input stage to said first intermediate stage,
third means connecting said input stage to said second intermediate stage,
fourth means connecting said second intermediate stage to said output stage,
said input stage including frequency selective means tuned to said high frequency component of said double modulated carrier signal,
said input stage being adapted to pass to said first intermediate stage said double modulated carrier signal,
said first intermediate stage being operable upon the reception of said double modulated carrier signal to produce an output signal,
said first means connecting said first intermediate stage to said input stage including
means to prevent the passage therethrough of said high frequency component, thereby demodulating said double modulated carrier signal and presenting a single modulated carrier signal to said input stage,
said input stage being operable upon the reception of said single modulated carrier signal to produce an output signal which is passed to said second intermediate stage through said third connecting means, and thence to said output stage through said fourth connecting means, and
said output stage including means to demodulate said single modulated carrier signal, thereby producing said low frequency component as the output signal thereof.

35. A receiver circuit assembly in accordance with claim 34, wherein
said first intermediate stage is operable to amplify the input signal applied thereto.

36. A receiver circuit assembly in accordance with claim 34, wherein
said third means includes blocking means to prohibit the passage of said double modulated carrier signal from said input stage to said second intermediate stage.

37. A receiver circuit assembly in accordance with claim 36, wherein
said first intermediate stage comprises an oscillator having an output tank tuned to the frequency of said high frequency component of said carrier wave, and
said second means is connected from the output of said input stage to said tuned tank.

38. A receiver circuit assembly in accordance with claim 37, wherein
said first means is interconnected between the output of said oscillator and said input stage and includes
an RF choke, and
an RF bypass capacitor,
said bypass capacitor having one terminal thereof connected to said choke and the other terminal thereof connected to ground.

39. A receiver circuit assembly in accordance with claim 38, wherein
said fourth means includes
a waveshaping network, and
a frequency selective network, and
said frequency selective network being tuned to said mid-frequency to permit the passage therethrough of said single modulated carrier signal at said mid-frequency.

40. A receiver circuit assembly in accordance with claim 39, wherein
said frequency selective network comprises
an inductor and
a capacitor,
said inductor and said capacitor being connected in series and forming a series tuned network.

41. A receiver circuit assembly in accordance with claim 40, wherein
said input stage includes a transistor having first, second and third termials, said second and third terminals being adapted to have said double modulated carrier signal applied thereacross and to produce an output signal across said first and second terminals, and said last mentioned output signal being applied to the tuned tank of said oscillator through said second means.

42. A receiver circuit assembly in accordance with claim 41, wherein said oscillator output is fed through said first means and applied across said second and third terminals to produce an output signal across said first and third terminals, and said last mentioned output signal being fed to said second intermediate stage through said third means.

43. A receiver circuit assembly in accordance with claim 42, wherein said first transistor terminal is the collector, said second transistor terminal is the base, and said third transistor terminal is the emitter.

44. A receiver circuit assembly in accordance with claim 43, wherein said frequency selective means comprises an inductor, and a capacitor, said inductor and said capacitor being connected in parallel between said emitter and a ground terminal.

45. A receiver circuit assembly in accordance with claim 44, wherein said blocking means of said third means comprises an RF choke, and an RF bypass capacitor, said choke being connected between said collector and said second intermediate stage, and said bypass capacitor being connected between the terminal of said choke remote from said collector and ground.

46. A receiver circuit assembly in accordance with claim 32, wherein said second output circuit comprises an input stage, and an output stage, said fan being connected as a load to said output stage, and said input stage including second frequency selective means to pass to said output stage substantially only those output signals from said receiver whose frequency is said second predetermined frequency.

47. A receiver circuit assembly in accordance with claim 46, wherein said input stage includes a third transistor having first, second and third terminals, a second transformer having primary and secondary coils, and a potential source, said second and third terminals being adapted to have said receiver output signal applied thereacross and to produce an output signal across said first and third terminals of said third transistor, said second frequency selective means including said transformer, said primary coil being connected between said potential source and said first terminal, said second frequency selective means also including a second capacitor connected in parallel across said primary coil and forming therewith a second resonant circuit tuned to said second predetermined frequency, and means for connecting said secondary coil and said output stage.

48. A receiver circuit assembly in accordance with claim 47, including a third capacitor connected in parallel across said secondary coil and forming therewith a third resonant circuit tuned to said second predetermined frequency, and said second resonant circuit and said third resonant circuit comprising said second frequency selective means.

49. A receiver circuit assembly in accordance with claim 48, wherein said first terminal of said third transistor is the collector, said second terminal of said third transistor is the base, and said third terminal of said third transistor is the emitter.

50. A receiver circuit assembly in accordance with claim 49, wherein said output stage of said second output circuit comprises switching means, and a bistable electro-mechanical flip-flop circuit, said fan being connected to a load to said flip-flop circuit, said flip-flop circuit having a first stable state rendering said fan operative and a second stable state rendering said fan inoperative, said switching means being operable upon the application of said first transistor output signal at said second predetermined frequency to switch said flip-flop circuit between said first and second stable states, whereby successive signals to said output stage alternately switch said flip-flop circuit between said first and second stable states to thereby variably activate said fan in dependence upon the condition of said flip-flop circuit.

51. A receiver circuit assembly in accordance with claim 32, wherein said second output circuit includes an input stage, an intermediate stage, and an output stage, said fan being connected as a load to said output stage, said input stage including second frequency selective means to pass to said intermediate stage substantially only those output signals from said receiver whose frequency is said second predetermined frequency, said output stage having an activated and an inactivated condition, said intermediate stage being operable upon the application of a signal from said input stage at said second predetermined frequency to switch said output stage between said activated and inactivated conditions, whereby successive signals to said intermediate stage alternately switch said output stage between said activated and inactivated conditions to thereby variably activate said fan in dependence upon the condition of said output stage.

52. A receiver circuit assembly in accordance with claim 51, wherein said fan is activated when said output circuit is in its activated condition and inactivated when said output circuit is in its inactivated position.

53. A receiver circuit assembly in accordance with claim 51, wherein said input stage includes a third transistor having first, second and third terminals, a second transformer having primary and secondary coils, and a potential source, said second and third terminals being adapted to have said receiver output signal applied thereacross and to produce an output signal across said first and third terminals of said third transistor, said second frequency selective means including said transformer, said primary coil being connected between said potential source and said first terminal, said second frequency selective means also including a second capacitor connected in parallel across said primary coil and forming therewith a second resonant circuit tuned to said second predetermined frequency, and means for connecting said secondary coil to said intermediate stage.

54. A receiver circuit assembly in accordance with claim 53, including a third capacitor connected in parallel across said secondary coil and forming therewith a third resonant circuit tuned to said second predetermined frequency, and said second resonant circuit and said third resonant circuit comprising said second frequency selective means.

55. A receiver circuit assembly in accordance with claim 54, wherein said first terminal of said third transistor is the collector, said second terminal of said third transistor is the base, and said third terminal of said third transistor is the emitter.

56. A receiver circuit assembly in accordance with claim 55, wherein said intermediate stage includes a fourth transistor having first, second and third terminals, a third relay, and a potential source, said second and third terminals being adapted to have the output signal of said third transistor applied thereacross and to produce an output signal across said first and third terminals when said third transistor output signal is at said second predetermined frequency, said third relay comprising a coil, a pair of normally closed contacts, and a pair of normally open contacts, said normally closed and said normally open contacts having a common junction therebetween connected to one of each of said pairs of contacts, a fourth capacitor connected between said common junction and a ground terminal, said fourth capacitor being adapted to be connected to charging means through said normally closed contacts and adapted to be connected to said output stage through said normally open contacts, said relay coil being connected between said potential source and said first terminal, whereby said output signal across said first and third terminals activates said third relay to close said normally open contacts and open said normally closed contacts and causes said fourth capacitor when in a charged condition to discharge through said normally open contacts to thereby switch said output stage from an inactivated condition to an activated position.

57. A receiver circuit assembly in accordance with claim 56, wherein said first terminal of said fourth transistor is the collector, said second terminal of said fourth transistor is the base, and said third terminal of said fourth transistor is the emitter.

58. A receiver circuit assembly in accordance with claim 57, wherein said output stage includes a fifth transistor having first, second and third terminals, a fourth relay, a fifth relay, and a potential source, said second and third terminals being adapted to have a signal applied thereacross and to drive said fifth transistor into a conductive state in response thereto, said first and third terminals being adapted to produce an output thereacross when said transistor is in said conductive state, said fourth relay comprising a coil, and a pair of contacts, said fourth relay contacts being conected in series with said fan, said fourth relay coil being connected between said last mentioned potential source and said first terminal, said fifth relay comprising a coil, a pair of normally closed contacts, and a pair of normally open contacts, said last mentioned normally closed and normally open contacts having a common junction therebetween connected to one of each of said pairs of contacts, said charging means including a voltage source connected to said last mentioned common junction, the other of said contacts of said normally closed contacts of said fifth relay being connected to the other of said contacts of said normally closed contacts of said fourth relay, and the other of said contacts of said normally open contacts of said fifth relay being connected to the other of said contacts of said normally open contacts of said fourth relay and to said second terminal.

59. A receiver circuit assembly in accordance with claim 58, wherein said first terminal of said fifth transistor is the collector, said second terminal of said fifth transistor is the base, and said third terminal of said fifth transistor is the emitter.

60. A receiver circuit assembly in accordance with claim 59, wherein said fourth relay contacts are normally open.

61. A receiver circuit assembly in accordance with claim 12, wherein said first output circuit comprises an input stage, and an output stage, said heating and cooling system being connected as a load to said output stage, and said input stage including second frequency selective means to pass to said output stage substantially only those output signals from said receiver whose frequency is said first predetermined frequency.

62. A receiver circuit assembly in accordance with claim 61, wherein said input stage includes a second transistor having first, second and third terminals, a second transformer having primary and secondary coils, and a potential source, said second and third terminals being adapted to have said receiver output signal applied thereacross and to produce a transistor output signal across said first and third terminals, said primary coil being connected between said potential source and said first terminal, said second frequency selective means comprising said primary coil and a capacitor connected in parallel across said primary coil and forming therewith a third resonant circuit tuned to said first predetermined frequency, and means for connecting said secondary coil to said output stage.

63. A receiver circuit assembly in accordance with claim 62, wherein said output stage comprises a triggering device, a trigger activating switch, and
a load activating switch,
means connecting said input circuit to said trigger activating switch,
means connecting said trigger activating switch to said triggering device,
means connecting said triggering device to said load activating device, and
means connecting said load activating device to said load,
said trigger activating switch being adapted to be actuated upon the application of an output signal from said input stage at said first predetermined frequency, and
actuation of said trigger activating switch actuating said triggering device and said load activating switch to thereby activate said load.

64. A receiver circuit assembly in accordance with claim 63, wherein
said output stage includes a timing circuit,
means connecting said timing circuit to said triggering device,
said timing circuit being operative upon the actuation of said triggering device to commence its timing cycle and operative upon the completion of its timing cycle to deactuate said triggering device and said load activating switch to thereby inactivate said load.

65. A receiver circuit assembly in accordance with claim 64, wherein
said timing circuit is reset to commence its timing cycle upon the application of another signal to said trigger activating switch during said initial timing cycle and prior to the completion thereof so as to maintain said load in an activated condition.

66. A receiver circuit assembly in accordance with claim 63, wherein
said trigger activating switch includes
a third transistor having first, second and third terminals, and
a potential source,
said potential source being connected to said first terminal,
said second and third terminals being adapted to have the output signal of said second transistor applied thereacross and to produce an output signal across said first and third terminals when said second transistor output signal is at said first predetermined frequency.

67. A receiver circuit assembly in accordance with claim 66, wherein
said triggering device is an SCR comprising
an anode,
a cathode, and
a gate,
a voltage source connected to said anode,
said means connecting said trigger activating switch to said triggering device comprising a relay including
a coil, and
a pair of normally closed contacts,
said coil being connected between said potential source and the first terminal of said third transistor,
said normally closed contacts being connected between said voltage source and a ground terminal, and
means connecting said gate to said voltage source and to one of the pair of said normally closed contacts, whereby when said third transistor conducts current flows through said relay coil causing said normally closed contacts to open to thereby cause current flow to the gate of said SCR causing the same to fire.

68. A receiver circuit assembly in accordance with claim 67, wherein said load activating switch comprises a second relay including
a coil,
a pair of normally closed contacts, and
a pair of normally open contacts,
said second relay coil being connected between said cathode and a ground terminal, and
said normally closed and normally open contacts being connected across said load and being adapted to activate the same upon opening of said normally closed contacts and closing of said normally open contacts,
whereby firing of said SCR causes current flow through said second relay coil causing said normally closed contacts to open and said normally open contacts to close to thereby activate said load.

69. A receiver circuit assembly in accordance with claim 68, wherein
said timing circuit is connected between the cathode of said SCR and a ground terminal, and
said timing circuit is operable upon the firing of said SCR to commence its timing cycle and operative upon completion of its timing cycle to cause said SCR to cease conducting to thereby inactivate said load.

70. A receiver circuit assembly in accordance with claim 69, wherein
said timing circuit is reset to commence its timing cycle upon the application of another signal to the gate of said SCR during said initial timing cycle and prior to the completion thereof so as to maintain said load in an activated condition.

71. A receiver circuit assembly in accordance with claim 70, wherein
said first mentioned relay includes a pair of normally opened contacts,
said first mentioned normally opened and normally closed contacts having a common junction therebetween connected to one of each of said pair of of contacts and to a ground terminal,
said timing circuit comprising
a unijunction transistor having
an emitter,
a first base, and
a second base,
a first series connected resistance-capacitance circuit, and
a second series connected resistance-capacitance circuit,
said first resistance-capitance circuit being connected between the cathode of said SCR and a ground terminal with the resistance being connected to said SCR cathode and said capacitance being connected to ground,
the junction between said resistance and capacitance being connected to ground through said normally open contacts of said first relay,
said second resistance-capitance circuit being connected between the cathode of said SCR and ground with the capacitance being connected to said SCR cathode and the resistance being connected to ground,
the junction between said last mentioned resistance and said last mentioned capacitance being connected to said first base, and
a resistor connected between said second base and said SCR cathode.

72. A receiver circuit assembly in accordance with claim 22, wherein
said first output circuit comprises
an input stage, and
an output stage,
said heating and cooling system being connected as a load to said output stage, and
said input stage including second frequency selective means to pass to said output stage substantially only those output signals from said receiver whose frequency is said first predetermined frequency.

73. A receiver circuit assembly in accordance with claim 72, wherein
said input stage includes
a fourth transistor having first, second and third terminals,
a second transformer having primary and secondary coils, and
a potential source,
said second and third terminals being adapted to have said receiver output signal applied thereacross and to produce a transistor output signal across said first and third terminals,
said primary coil being connected between said potential source and said first terminal,
said frequency selective means comprising said primary coil and a capacitor connected in parallel across said primary coil and forming therewith a third resonant circuit tuned to said first predetermined frequency, and
means for connecting said secondary coil to said output stage.

74. A receiver circuit assembly in accordance with claim 73, wherein
said output stage comprises
a triggering device,
a trigger activating switch, and
a load activating switch,
means connecting said input circuit to said trigger activating switch,
means connecting said trigger activating switch to said triggering device,
means connecting said triggering device to said load activating device, and
means connecting said load activating device to said load,
said trigger activating switch being adapted to be actuated upon the application of an output signal from said input stage at said first predetermined frequency, and
actuation of said trigger activating switch actuating said triggering device and said load activating switch to thereby activate said load.

75. A receiver circuit assembly in accordane with claim 74, wherein
said output stage includes a timing circuit,
means connecting said timing circuit to said triggering device,
said timing circuit being operative upon the actuation of said triggering device to commence its timing cycle and operative upon the completion of its timing cycle to deactuate said trigging device and said load activating switch to thereby inactive said load.

76. A receiver circuit assembly in accordance with claim 75, wherein
said timing circuit is reset to commence its timing cycle upon the application of another signal to said trigger activating switch during said initial timing cycle and prior to the completion thereof so as to maintain said load in an activated condition.

77. A receiver circuit assembly in accordance with claim 74, wherein
said trigger activating switch includes
a fifth transistor having first, second and third terminals, and
a potential source,
said potential source being connnected to said first terminal,
said second and third terminals being adapted to have the output signal of said fourth transistor applied thereacross and to produce an output signal across said first and third terminals when said fourth transistor output signal is at said first predetermined frequency.

78. A receiver circuit assembly in accordance with claim 77, wherein
said triggering device is an SCR comprising
an anode,
a cathode, and
a gate,
a voltage source connected to said anode,
said means connnecting said trigger activating switch to said triggering device comprising a fourth relay including
a coil, and
a pair of normally closed contacts,
said coil being connected between said potential source and the first terminal of staid fifth transistor,
said normally closed contacts being connected between said voltage source and a ground terminal, and
means connnecting said gate to said voltage source and to one of the pair of said normally closed contacts, whereby when said fifth transistor conducts current flows through said fourth relay coil causing said normally closed contacts to open to thereby cause current flow to the gate of said SCR causing the same to fire.

79. A receiver circuit assembly in accordance with claim 78, wherein
said load activating switch comprises a fifth relay including
a coil,
a pair of normally closed contacts, and
a pair of normally open contacts,
said fifth relay coil being connected between said cathode and a ground terminal, and
said normally closed and normally open contacts being connected across said load and being adapted to activate the same upon opening of said normally closed contacts and closing of said normally open contacts.
whereby firing of said SCR causes current flow through said fifth relay coil causing said normally closed contacts to open and said normally open contacts to close to thereby activate said load.

80. A receiver circuit assembly in accordance with claim 79, wherein
said timing circuit is connected between the cathode of said SCR and a ground terminal, and
said timing circuit is operable upon the firing of said SCR to commence its timing cycle and operative upon completion of its timing cycle to cause said SCR to cease conducting to thereby inactivate said load.

81. A receiver circuit assembly in accordance with claim 80, wherein
said timing circuit is reset to commence its timing cycle upon the application of another signal to the gate of said SCR during said initial timing cycle and prior to the completion thereof so as to maintain said load in an activated condition.

82. A receiver circuit assembly in accordance with claim 81, wherein
said first mentioned relay includes a pair of normally opened contracts,
said first mentioned normally opened and normally closed contacts having a common junction therebetween connected to one of each of said pairs of contacts and to a ground terminal,
said timing circuit comprising
a unijunction transistor having
an emitter,
a first base, and
a second base,
a first series connected resistance-capacitance circuit, and
a second series connected resistance-capacitance circuit, said first resistance-capacitance circuit being connected between the cathode of said SCR and a ground terminal with the resistance being connected to said SCR cathode and said capacitance being connected to ground, the junction between said resistance and capacitance being connected to ground through said normally open contacts of said first relay, said second resistance-capacitance circuit being connected between the cathode of said SCR and ground with the capacitance being connected to said SCR cathode and the resistance being connected to ground, the junction between said last mentioned resistance and said last mentioned capacitance being connected to said first base, and a resistor connected betwen said second base and said SCR cathode.

References Cited

UNITED STATES PATENTS 3,377,545 4/1968 Tveit ---------------- 165—26

CHARLES SUKALO, Primary Examiner